United States Patent [19]
Boldrini et al.

[11] Patent Number: 5,246,098
[45] Date of Patent: Sep. 21, 1993

[54] OUTPUT CONVEYOR UNIT FOR RIGID HINGED-LID CIGARETTE PACKING MACHINES

[75] Inventors: Fulvio Boldrini, Ferrara; Antonio Gamberini, Bologna, both of Italy

[73] Assignee: G.D. Societa' per Azioni, Italy

[21] Appl. No.: 917,459

[22] Filed: Jul. 21, 1992

[30] Foreign Application Priority Data

Jul. 29, 1991 [IT] Italy .............................. BO91A000284

[51] Int. Cl.[5] .............................................. B65G 29/00
[52] U.S. Cl. .................................. 198/476.1; 198/482.1; 198/605
[58] Field of Search ............ 198/463.2, 468.6, 468.01, 198/468.9, 468.11, 456, 457, 705, 482.1, 483.1, 470.1, 605, 611, 476.1; 53/233, 234

[56] References Cited

U.S. PATENT DOCUMENTS

| 4,341,056 | 7/1982 | Leanna et al. | 53/234 X |
| 4,428,177 | 1/1984 | Focke et al. | 53/234 X |
| 4,559,757 | 12/1985 | Focke et al. | 198/605 X |
| 4,852,335 | 8/1989 | Focke et al. | 53/234 X |
| 4,866,912 | 9/1989 | Deutsch | 53/233 X |
| 4,883,161 | 11/1989 | Focke | 198/482.1 X |

Primary Examiner—Robert P. Olszewski
Assistant Examiner—Cheryl L. Gastineau
Attorney, Agent, or Firm—Marshall, O'Toole, Gerstein, Murray & Borun

[57] ABSTRACT

An output conveyor unit for rigid hinged-lid cigarette packing machines, whereby a first conveyor, consisting of a packing wheel, successively feeds the semifinished packets to respective seats on a drying conveyor, each seat having a movable wall which is moved by an actuating element as the packet is inserted inside the seat, and then released for axially compressing the packet and maintaining it in the correct drying position.

6 Claims, 2 Drawing Sheets

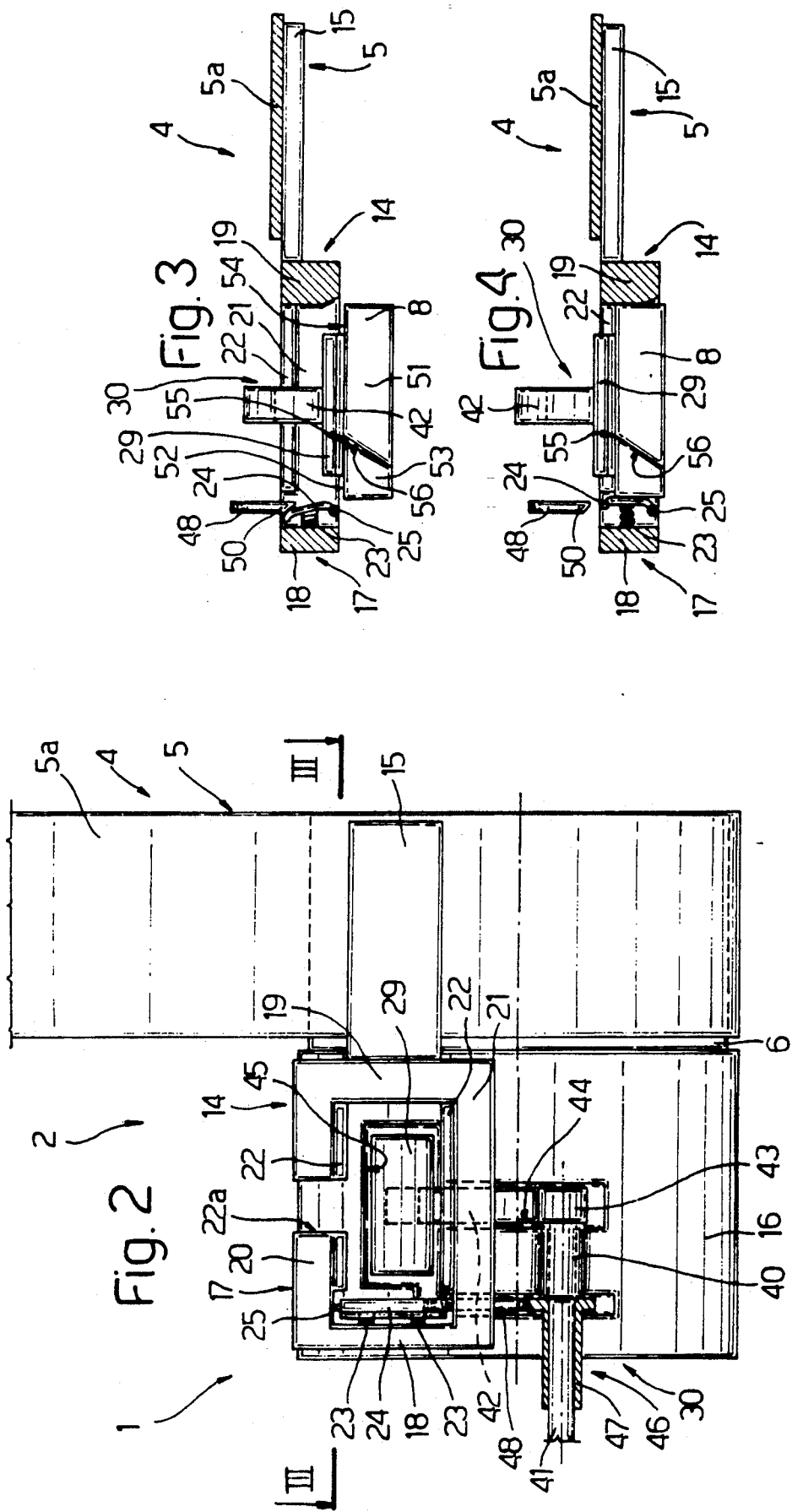

OUTPUT CONVEYOR UNIT FOR RIGID HINGED-LID CIGARETTE PACKING MACHINES

BACKGROUND OF THE INVENTION

The present invention relates to an output conveyor unit for rigid hinged-lid cigarette packing machines.

Known cigarette packing machines of the aforementioned type feature an output conveyor comprising a first and second conveyor cooperating at a given point of tangency.

The first conveyor normally consists of a packing wheel having a number of peripheral seats, which, as the wheel is rotated about its axis, are fed through a loading station where each seat is fed with a packing blank and a preformed group of cigarettes. Each group is substantially in the form of a rectangular parallelepipedon, and is so inserted inside the seat on the packing wheel as to travel perpendicular to its smaller lateral surface, with its larger lateral surface facing outwards, which larger surface, when the packet is completed, extends in contact with a front portion of the packet partially defined by a movable front portion of the lid.

Each blank is folded partially in a U about the group as it is inserted inside the seat, and is gummed as required and gradually folded by the packing wheel into a semifinished packet, which is normally completed by a final folding operation as the packet is transferred from the packing wheel to a respective seat on the second conveyor.

The second conveyor normally consists of stabilizing or drying conveyor along which the gummed portions of each packet are at least partially dried for achieving a firm shape of the packet.

Known packing machines of the aforementioned type normally involve a certain amount of inaccuracy in the positioning of the overlapping gummed portions of the packets, which frequently results in partial or faulty closure of the lids.

Such inaccuracy is normally due to the seats on the second conveyor being oversized axially to prevent chafing, i.e. so as to cooperate loosely with the axial end surfaces of the packets, which clearance, however, also results at times in imperfect shaping of the lids of the packets.

SUMMARY OF THE INVENTION

It is an object of the present invention to provide an output conveyor unit for packing machines of the aforementioned type, designed to overcome the aforementioned drawback.

According to the present invention, there is provided an output conveyor unit for rigid hinged-lid cigarette packing machines, the conveyor unit comprising a first conveyor consisting of a packing wheel having a number of first seats, each for receiving a respective packet; a second conveyor having a number of second seats, each for receiving a respective said packet from a respective said first seat; and means for transferring said packets from said first seats to the corresponding said second seats; characterized by the fact that each said second seat comprises a wall moving, against the action of elastic mans, from a first forward position wherein pressure is exerted on the longitudinal end surface of said packet, to a second withdrawn position; actuating means cooperating with said transfer means, for moving said wall into said withdrawn position as said packet is transferred from said first to said second seat.

BRIEF DESCRIPTION OF THE DRAWINGS

A non-limiting embodiment of the present invention will be described by way of example with reference to the accompanying drawings, in which:

FIG. 2 shows a schematic front view of a detail in FIG. 1;

FIG. 3 shows a section along line III—III in FIG. 2;

FIG. 4 shows the same section as in FIG. 3 in a different operating position.

DETAILED DESCRIPTION OF THE INVENTION

Figure 1:
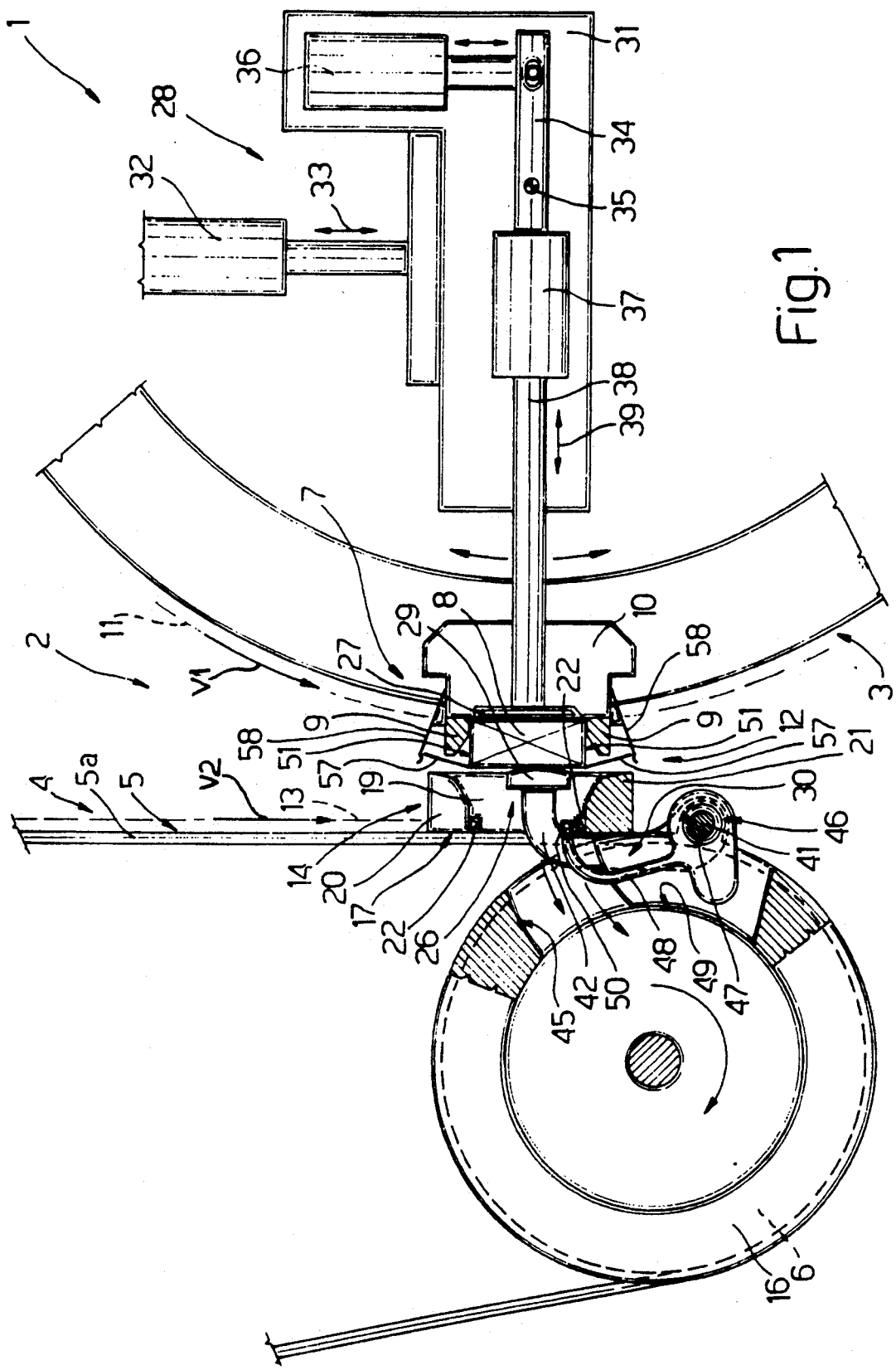
FIG. 1 shows a schematic, partially sectioned side view, with parts removed for clarity, of a preferred embodiment of the output conveyor unit according to the present invention.

Number 1 in FIG. 1 indicates a cigarette packing machine, in particular for packing cigarettes in rigid hinged-lid packets, as described in Italian Patent Application n. BO91A 000019 to which full reference is made herein in the interest of full disclosure.

Machine 1 comprises an output conveyor unit 2 in turn comprising a first conveyor consisting of a known packing wheel 3 rotating at a substantially constant surface speed V1 about its axis (not shown) perpendicular to the FIG. 1 plane; and a second conveyor, in particular a stabilizing and/or drying conveyor 4, the belt 5 of which is looped about two pulleys 6 (only one of which is shown) having their axes parallel to that of wheel 3, and one of which is located adjacent to, and the other (not shown) a given distance from wheel 3. Belt 5 comprises a straight branch 5a extending parallel to the FIG. 1 plane, facing the outer edge of wheel 3, and driven axially at a speed V2, substantially equal in absolute value to speed V1, by a drive unit (not shown) connected to one of pulleys 6.

The outer edge of wheel 3 presents a number of equally-spaced through seats 7, each receiving a respective packet of cigarettes 8, and defined laterally by two shoulders 9 extending axially in relation to wheel 3. Shoulders 9 are supported on a base plate 10 connected integral with the end surface of wheel 3, and project radially outwards of wheel 3.

As wheel 3 is rotated about its axis, seats 7 are fed along a curved, more specifically, circular path 11 substantially tangent, at point 12, to the looped path 13 of a number of seats 14 equally spaced along belt 5 with the same spacing as seats 7. As shown in FIG. 1, the point of tangency 12 is located along branch 5a, immediately upstream, in the traveling direction of branch 5a, from the point of contact between branch 5a and the edge of pulley 6 adjacent to wheel 3.

As shown more clearly in FIG. 2, each seat 14 comprises a substantially rectangular connecting plate 15 connected to and extending across belt 5, and by which seat 14 is supported so as to project from belt 5 and face path 11 of seats 7. At pulley 6 adjacent to wheel 3, path 13 winds about the outer edge of a roller 16 coaxial and integral with pulley 6, and the outer circumference of which is substantially equal to the spacing of seats 14 along belt 5.

Each seat 14 is defined by a substantially rectangular frame 17 having its longitudinal axis perpendicular to that of belt 5, and comprising two shorter sides defined by two shoulders 18 and 19 parallel to belt 5, and of which shoulder 19 is connected integral with plate 15; and two longer side defined by two cross members 20 and 21 perpendicular to belt 5 and having respective inner beads 22 defining a supporting surface for a respective packet 8. Cross member 20, upstream from cross member 21 in the traveling direction of seats 14, is divided into two portions by a central opening 22a.

As shown more clearly in FIGS. 3 and 4, along the inner surface of shoulder 18, frame 17 supports, via the interposition of springs 23, a wall or plate 24 substantially parallel to shoulder 18, substantially perpendicular to plate 15, and having an outer longitudinal edge connected to frame 17 via a cylindrical hinge 25 perpendicular to cross members 20 and 21. Plate 24 is designed to rotate about the axis of hinge 25, and against the action of springs 23, between a forward idle position wherein it defines, with shoulder 19, a compartment at most equal in length to packet 8, and a withdrawn position wherein it defines, with shoulder 19, a compartment greater in length than packet 8.

In addition to wheel 3 and conveyor 4, output conveyor unit 2 of machine 1 also comprises a device 26 for transferring packets 8 from wheel 3 to conveyor 4 at the point of tangency 12.

Device 26 comprises a pusher 27 cooperating with wheel 3 and consisting of a plate engaged and moved successively through seats 7 by an actuating device 28; and a counterpusher 29 cooperating with conveyor 4 and consisting of a plate engaged and moved successively through seats 14 by an actuating device 30.

In actual practice, actuating device 28 consists of relatively complex crank mechanisms (not shown), which, according to the manner in which pusher 27 is operated, may be illustrated theoretically as shown in FIG. 1, wherein device 28 is shown to consist of a platform 31 housed inside wheel 3 and moved, by a first double-acting linear actuator 32, in direction 33 parallel to path 13; a rocker arm 34 pivoting on platform 31 and rotated about an axis 35 parallel to the rotation axis of wheel 3 by a second double-acting linear actuator 36 supported on platform 31 and connected to a first arm of rocker arm 34; and a third double-acting linear actuator 37 connected coaxially to a second arm of rocker arm 34, and having an output rod 38 connected integral with pusher 27 and moved axially by actuator 37 in direction 39.

As shown more clearly in FIG. 2, part of actuating device 30 consisted of roller 16, the edge of which is fitted integral with an axial bush 40 engaged in rotary manner by a shaft 41 parallel to the axis of roller 16. Actuating device 30 also comprises a substantially L-shaped arm 42, one end of which presents a bush 43 fitted to the portion of shaft 41 projecting from bush 40, and the other end of which is fitted integral with counterpusher 29.

When shaft 41 is oscillated about its axis by a cam device (not shown) or similar actuating element, arm 42 is also oscillated about the axis of shaft 41 between a withdrawn position wherein arm 42 is substantially housed inside an opening 44 formed on the outer surface of roller 16 and comprising an end cavity 45 housing counterpusher 29, and an extracted position wherein counterpusher 29 is located outwards of the outer surface of roller 16, and by a distance at least equal to the depth of seats 14.

Actuating device 30 cooperates with a further actuating device 46 comprising a bush 47 located on the opposite side of bush 40 as compared with bush 43, and fitted to the portion of shaft 41 projecting from bush 40. Actuating device 46 also comprises a substantially L-shaped arm 48 connected integral, at one end, with the outer edge of bush 47, and extending parallel to arm 42.

When shaft 41 is oscillated about its axis by said cam device (not shown) or similar actuating element, arm 48 is oscillated about the axis of shaft 41 between a withdrawn position wherein arm 48 is substantially housed inside an opening 49 formed on the outer surface of roller 16 and parallel and adjacent to opening 44, and an extracted position wherein an end tooth 50 on arm 48 is located outwards of roller 16 and engages the longitudinal edge of plate 24 opposite respective hinge 25, so as to rotate plate 24 into the withdrawn position.

In actual use, each packet 8 is formed inside respective seat 7 with the two smaller lateral surfaces 51 contacting shoulders 9, and with a front wall facing outwards, which front wall is defined, on the finished packet 8 (FIGS. 3 and 4), by the front wall 52 of a hinged lid 53, and by the front wall 54 of packet 8, both coplanar with each other and contacting along respective edges 55 and 56.

Each packet 8 is fed, partially folded, by wheel 3 to point of tangency 12, the final folding operation being performed as packet 8 is transferred from wheel 3 to conveyor 4. More specifically, and as shown in FIG. 1, each packet 8 presents two longitudinal tabs 57, which, as packet 8 approaches the point of tangency 12, still extend outwards of shoulders 9, and are supported by respective elastic arms 58.

As packet 8 on wheel 3 approaches the point of tangency 12, actuating device 28 is set to an idle position wherein axis 35 of rocker arm 34 substantially coincides with the axis of wheel 3, and rod 38 is positioned radially in relation to the edge of wheel 3. As a seat 7 approaches pusher 27, actuator 36 is operated so as to rotate rocker arm 34 about axis 35, and so move pusher 27 parallel to path 11, and eventually bring and maintain it in line with seat 7. Once positioned immediately upstream form the point of tangency 12, pusher 27 is moved by actuator 37 in direction 39 and into contact with packet 8 inside seat 7 (FIG. 1).

At the same time, by virtue of the clockwise rotation (in FIG. 1) of pulley 6 adjacent to wheel 3 and of roller 16, counterpusher 29 moves towards the point of tangency 12 and, as pusher 27 is brought into contact with packet 8 by actuator 37, is pushed by actuator 30 outwards of cavity 45, through seat 14 and into contact with the surface of packet 8 defined by surfaces 52 and 54 (FIG. 3).

As shown in FIG. 3, when counterpusher 29 is brought into contact with packet 8, the shape of the latter is slightly distorted by edges 55 and 56 failing to contact perfectly, which defect is sue to the clearance necessarily allowed inside seat 7 for enabling correct folding of packet 8.

The above drawback is eliminated by plate 24 and arm 48, which, as shaft 41 is rotated for expelling counterpusher 29 from cavity 45, is also extracted from opening 49, so as to bring tooth 50 (FIG. 3) into engagement with the edge of plate 24 opposite hinge 25, rotate plate 24 against the action of springs 23, and so enlarge seat 14.

As pusher 27 and counterpusher 29 are moved simultaneously towards seat 14 directly facing seat 7 at the point of tangency 12, and plate 24 is released by tooth 50 of arm 48, packet 8 (FIG. 4) is transferred into seat 14 and compressed axially by plate 24, with the aid of springs 23, so as to being edge 55 into contact with edge 56.

Actuating devices 28, 30 and 46 thus provide, not only for troublefree transfer of packet 8 between two continuously-moving conveyors (packing wheel 3 and conveyor 4), but also, via plate 24 and arm 48, which is operated simultaneously and in conjunction with counterpusher 29, for assisting insertion of packet 8 inside seat 14, while at the same time correcting any defects in the shape of packet 8.

We claim:

1. An output conveyor unit (2) for rigid hinged-lid cigarette packing machines (1), the conveyor unit (2) comprising a first conveyor consisting of a packing wheel (3) having a number of first seats (7), each for receiving a respective packet (8); a second conveyor (4) having a number of second seats (14), each for receiving a respective said packet (8) from a respective said first seat (7); and means (26) for transferring said packets (8) from said first seats (7) to the corresponding said second seats (14); characterized by the fact that each said second seat (14) comprises a wall (24) moving, against the action of elastic means (23), from a first forward position wherein pressure is exerted on the longitudinal end surface of said packet (8), to a second withdrawn position; actuating means (48) cooperating with said transfer means (26), for moving said wall (24) into said withdrawn position as said packet (8) is transferred from said first (7) to said second (14) seat.

2. A unit as claimed in claim 1, characterized by the fact that said movable wall (24) is defined by a plate (24) housed inside and rotating about an axis in relation to the respective said second seat (14) against the action of said elastic means (23).

3. A unit as claimed in claim 2, characterized by the fact that said plate (24) is substantially rectangular, and connected along a first longitudinal edge and via a cylindrical hinge (25) to the respective said second seat (14); a second longitudinal edge of said plate (24) being engaged by said actuating means (48).

4. A unit as claimed in claim 1, characterized by the fact that said transfer means (26) comprise a pusher (27) and a counterpusher (29); said counterpusher (29) moving successively through said second seats (14) to and from an extracted operating position; and said actuating means (48) comprising an arm (48) moving with said counterpusher (29) to and from a position wherein it engages said movable wall (24).

5. A unit as claimed in claim 4, characterized by the fact that said second conveyor (4) is substantially tangent to said first conveyor (3) at a point of tangency (12), and comprises a looped belt (5), and a pulley (6) for said belt (5); and pulley (6) being located adjacent to said point of tangency (12); and a roller (16) being integral with said pulley (6) and supporting said counterpusher (29) and said arm (48).

6. A unit as claimed in claim 5, characterized by the fact that said counterpusher (29) and said arm (48) are fitted to and rotate in relation to said roller (16) about a common axis (41) parallel to the rotation axis of said roller (16), said counterpusher (29) to and from said extracted operating position, and said arm (48) to and from said engaged position.

* * * * *